(12) United States Patent
Vanderhye (10) Patent No.: US 7,811,060 B2
(45) Date of Patent: Oct. 12, 2010

(54) VAWT CLUSTER AND INDIVIDUAL SUPPORTING ARRANGEMENTS

(76) Inventor: Robert A. Vanderhye, 801 Ridge Dr., McLean, VA (US) 22101-1625

( * ) Notice: Subject to any disclaimer, the term of this patent is extended or adjusted under 35 U.S.C. 154(b) by 839 days.

(21) Appl. No.: 11/701,480

(22) Filed: Feb. 2, 2007

(65) Prior Publication Data
US 2007/0212225 A1 Sep. 13, 2007

Related U.S. Application Data

(60) Provisional application No. 60/781,342, filed on Mar. 13, 2006, provisional application No. 60/796,542, filed on May 2, 2006.

(51) Int. Cl.
*F04D 29/26* (2006.01)
(52) U.S. Cl. .................. 416/120; 415/907; 416/DIG. 6
(58) Field of Classification Search .................. 52/146; 60/398; 415/2.1–4.5, 905–908; 416/DIG. 6
See application file for complete search history.

(56) References Cited

U.S. PATENT DOCUMENTS

| | | | | |
|---|---|---|---|---|
| 1,008,148 | A | * | 11/1911 | Hibbs .......................... 415/18 |
| 1,471,870 | A | | 10/1923 | Tust |
| 2,252,523 | A | * | 8/1941 | Plotkin ........................ 415/4.4 |
| 4,095,422 | A | * | 6/1978 | Kurakake .................... 60/398 |
| 4,156,580 | A | | 5/1979 | Pohl |
| 4,165,468 | A | * | 8/1979 | Fry et al. ...................... 290/55 |
| 4,184,084 | A | * | 1/1980 | Crehore ....................... 290/55 |
| 4,359,311 | A | | 11/1982 | Benesh |
| 4,496,847 | A | | 1/1985 | Parkins |
| 4,500,259 | A | | 2/1985 | Schumacher |
| 4,764,683 | A | * | 8/1988 | Coombes ..................... 290/55 |
| 4,830,570 | A | * | 5/1989 | Benesh ........................ 415/4.4 |

(Continued)

FOREIGN PATENT DOCUMENTS

SE 521083 9/2003

OTHER PUBLICATIONS

Johnson, Gary L.; Wind Energy Systems; Chapter 1, Sec. 5, Innovative Wind Turbines; Nov. 20, 2001; pp. 1-16 thru 1-18.

*Primary Examiner*—Edward Look
*Assistant Examiner*—Ryan H Ellis (57) ABSTRACT

One or more vertical axis wind turbines (VAWT), preferably of the Savonius type, are mounted in a relatively simple and inexpensive manner. For a single VAWT a center pole may be disposed within a hollow shaft of the VAWT with at least upper and lower bearings acting between the shaft and center pole. Alternatively, a short tower or platform may mount a lower bearing (e. g. about 4-14 feet off the ground) for the VAWT shaft, and an upper bearing for the shaft may be mounted by an outrigger. The outrigger is connected at a number of different points (e. g. different arms) by strands (such as steel cables) to stationary supports. Where multiple VAWTs are provided, them may be in a cluster. Each VAWT in the cluster has a structural support in common with at least one other VAWT of the cluster, and each VAWT is operatively connected to a separate useful driven mechanism (such as an electricity or fuel gas generator). Each VAWT typically has an outrigger mounting an upper bearing, with strands, rods, or bars, connecting outriggers of adjacent VAWTs together. Different VAWTs in the cluster preferably rotate in different directions.

20 Claims, 6 Drawing Sheets

U.S. PATENT DOCUMENTS

| | | |
|---|---|---|
| 4,979,871 A | 12/1990 | Reiner |
| 6,602,045 B2 | 8/2003 | Hickey |
| 7,071,579 B2 | 7/2006 | Erdman et al. |
| 2004/0056486 A1 | 3/2004 | Wobben |
| 2005/0230980 A1 | 10/2005 | Brunet |
| 2005/0263057 A1 | 12/2005 | Green |

* cited by examiner

VAWT CLUSTER AND INDIVIDUAL SUPPORTING ARRANGEMENTS

CROSS REFERENCE TO RELATED APPLICATIONS

This application claims the benefit of and incorporates by reference provisional application Ser. No. 60/781,342 filed Mar. 13, 2006 and provisional application Ser. No. 60/796,542 filed May 2, 2006, both of which in turn incorporate by reference provisional Ser. No. 60/756,233 filed Jan. 5, 2006.

BACKGROUND & SUMMARY OF THE INVENTION

A Vertical Axis Wind Turbine (VAWT) of any significant size, whether used on land or substantially stationary barge or platform locations, typically needs bearings adjacent the top and bottom thereof in order to mount the substantially vertical shaft of the VAWT securely for proper rotation. This typically requires building some sort of rigid supporting structure of significant size, such as the three legged tower shown in U.S. Ser. No. 11/265,278 filed Nov. 3, 2005, the disclosure of which is hereby incorporated by reference herein, or the very heavy single supporting central pedestal, such as shown in U.S. Pat. No. 4,359,311. Such a tower or pedestal can be expensive, more expensive than the turbine of the VAWT itself.

It is highly desirable to minimize the number, size, and/or expense of such supporting structures. According to a first aspect of the present invention, this is accomplished by providing a plurality of VAWTs clustered together, with common and less expensive supporting structures.

In more detail of this first aspect, there is provided a cluster of at least VAWTs. Each VAWT in the cluster has a structural support in common with at least one other VAWT of the cluster. Also, each VAWT is operatively connected to a separate useful driven mechanism, are electricity generating or fuel gas producing elements.

That is, there may be provided cluster of a plurality of widely spaced vertical axis wind turbines, each connected to a separate useful driven mechanism; and a plurality of structural supports for the VAWTs, including at least one structural support common to at least two of the plurality of VAWTs. Each VAWT may have a structural support in common with at least one other vertical axis wind turbine. Preferably, at least one of the VAWTs has an outrigger element operatively connected at or adjacent a top portion thereof and to an upper bearing; and the structural supports may comprise a strand (e. g. cable), rod, or bar operatively connected to the outrigger element. In fact each of the vertical axis wind turbines preferably has an outrigger element operatively connected at or adjacent a top portion thereof, and a structural support is operatively connected from each outrigger element to at least one other outrigger element. Also, preferably a strand is connected from at least one of the outrigger elements to a stationary support.

The cluster of vertical axis wind turbines preferably includes least three vertical axis wind turbines arranged on the imaginary periphery of a polygon, circle, or oval. Also, preferably at least one of the wind turbines rotates in the opposite direction to at least one other wind turbine. If an even number of wind turbines is provided then preferably alternating turbines along the imaginary periphery rotate in opposite directions.

While a wide variety of vertical axis wind turbines may be provided in the cluster, preferably they comprise three bladed Savonius wind turbines.

According to a second aspect of the invention, rather than clustering, a single VAWT is supported by a relatively light supporting structure, and an outrigger operatively connected to a stationary support.

That is, according to this second aspect, there is provided a vertical axis wind turbine comprising: A plurality of vanes, the vanes operatively connected to a central shaft structure mounted by at least one lower bearing for rotation about a substantially vertical axis. An outrigger operatively connected at or adjacent a top portion of the central shaft structure with an upper bearing operatively disposed between the outrigger and the central shaft structure. And a plurality of structural supports operatively connected to a plurality of different portions of the outrigger, and each also operatively connected to a stationary support.

The outrigger may comprise at least three distinct arms, and the structural supports may comprise at least three strands (such as steel cables), one operatively connected to each arm and to a different stationary support. Desirably, the lower bearing is mounted by a short tower or platform; for example the short tower or platform mounts the lower bearing about four-fourteen feet above the ground, and the bottoms of said vanes are above the lower bearing and positioned not to interfere with a human positioned under the bottoms of the vanes. Typically, a useful driven mechanism (e. g. electricity or fuel gas generator, pump, or the like) is operatively connected to the central shaft structure below the lower bearing and within the periphery of the short tower or platform. While the central shaft structure may comprise multiple shafts, preferably it comprises a single shaft that has a pivotal connection above the short tower or platform.

Again, while a wide variety of VAWTs may be utilized, preferably the vanes are at least partially curved, and the VAWT is a 2 or 3 bladed Savonius.

According to a third aspect of the invention, a Savonius or helical VAWT is provided that uses a central mounting structure which includes a hollow central shaft.

That is, according to this third aspect there is provided a Savonius or helical VAWT having a hollow central shaft, with a center pole extending through the shaft for mounting the Savonius or helical VAWT. And at least upper and lower bearings operatively disposed between the shaft and center pole for mounting the shaft for rotation with respect to the center pole about a substantially vertical axis. The bearings may be provided between the interior of the shaft and exterior of the center pole, and more than upper and lower bearings may be utilized, and the center pole and shaft may be tapered. Alternatively, the upper bearing is mounted exteriorly of the shaft and supported by a portion of the center pole above the shaft.

It is the primary object of the present invention to provide enhanced, yet less expensive and/or more easily fabricated or installed, mounting mechanisms for VAWTs. This and other objects of the invention will become clear from a detailed description of the invention, and from the appended claims.

DETAILED DESCRIPTION OF THE DRAWINGS

Figures 1, 2:
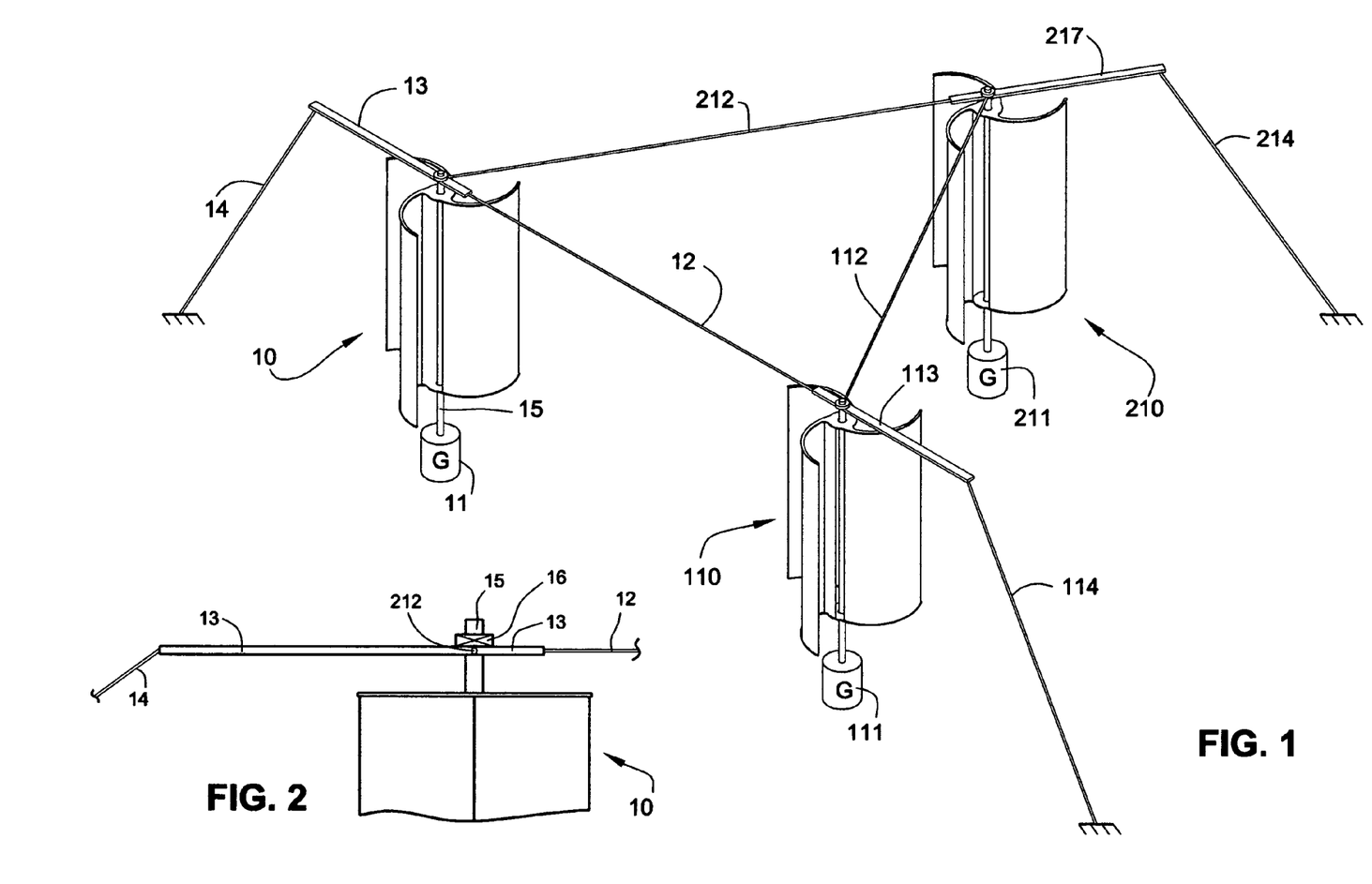
FIG. 1 is a top schematic perspective view of three clustered VAWTs having common support elements, according to the present invention.
FIG. 2 is a side view at or adjacent the top of one of the VAWTs of FIG. 1.

FIG. 1 shows three clustered VAWTs 10, 110, 210, spaced from each other, but provided in the same general area and having common support elements. As illustrated they are three bladed Savonius wind turbines such as shown in U.S. Ser. No. 11/265,278 filed Nov. 3, 2005, but they may be essentially any type of VAWT including two bladed Savonius, helical, Darrieus, hybrids, etc. These include, but are not limited to, the VAWTs shown at www.windside.com; "Wind Energy Systems", by Dr. Gary L. Johnson, Nov. 20, 2001, Chapter 1, pages 1-16 through 1-18; U.S. Pat. Nos. 1,697,574, 2,677,344, 4,500,259, 4,624,624, 4,830,570, 6,293,835 and 6,966,747; Popular Science July, 1933 "New Rotor Ship Sails In Lightest Wind"; Japanese patent publication 9287549 published Nov. 4, 1997; and "Modified Savonius Rotor" at www-.pandragon.com.

The invention seeks to use relatively inexpensive mechanisms [for example cheaper than the tower shown in the '278 application] to support the VAWTs at or adjacent the tops thereof, so that both upper and conventional lower (not shown) bearings are utilized. While the drawings show the elements mounted on land, they may be mounted in or on (e.g. a moored barge) water.

At the bottoms thereof each VAWT 10, 110, 210 drives its own useful driven mechanism, such as the generators 11, 111, 211 (or any other electricity producing structures), fuel gas—e. g. hydrogen—producing elements, pumps, or the like, and has a conventional bearing (not shown). At or adjacent the tops thereof the VAWTs are connected by strong cables, wires, or other strands 12, 112, 212, such as steel cables, although strong (e. g. steel or titanium) bars or rods can be substituted for the cables under some circumstances. Extending in-line with each strand 12, 112, 212 is a substantially rigid (e. g. steel, titanium, carbon fiber reinforced plastic, nano-tube composite, etc.) outrigger element 13, 113, 213, which may have a portion thereof extending on the opposite side of the VAWT 10, 110, 210, as seen in both FIGS. 1 & 2. Tethering strands (e.g. steel cables) 14, 114, 214 connect the outrigger elements 13, 113, 213 to the ground (e. g. a concrete anchor extending deep into the ground). Rigid supports may be provided in place of or in addition to one or more of the tethering strands.

FIG. 2 shows the top, or a structure adjacent the top if other wind-response elements are positioned above, of an exemplary VAWT 10 in detail. The shaft 15 of the VAWT 10 is journalled in bearing 16 at or adjacent the top of the VAWT 10. The outrigger element 13, in this case in the form of an arm, is operatively connected to the bearing 16, and both are stationary with respect to shaft 15. While a connection point for cable 212 is seen in FIG. 2 for clarity of illustration, in fact it would be opposite of where it is shown in FIG. 2 if the VAWTs 10, 110, 210 were clustered as seen in FIG. 1.

Figure 3:
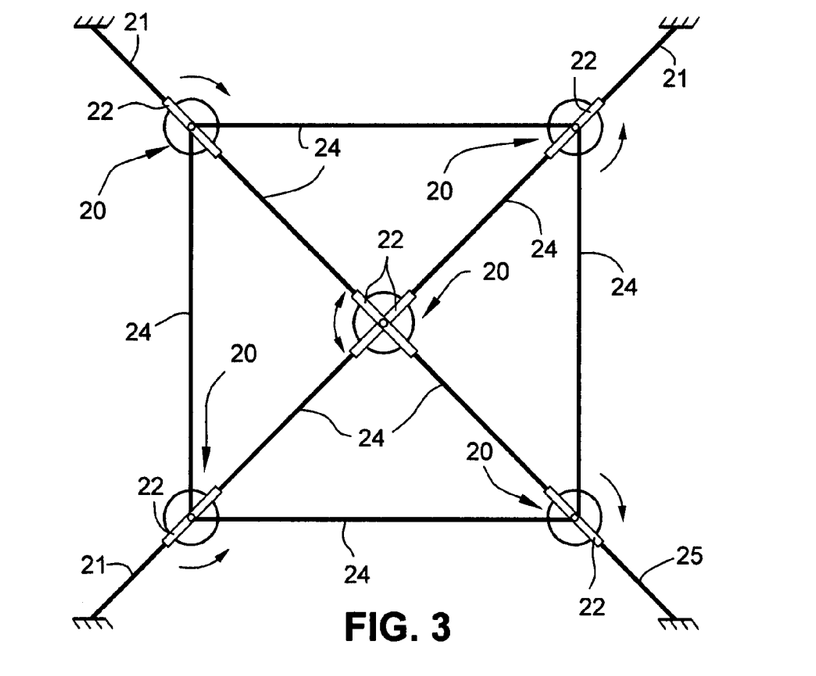
FIG. 3 is a top schematic view of one exemplary configuration of five clustered VAWTs using common support elements.
Figure 4:
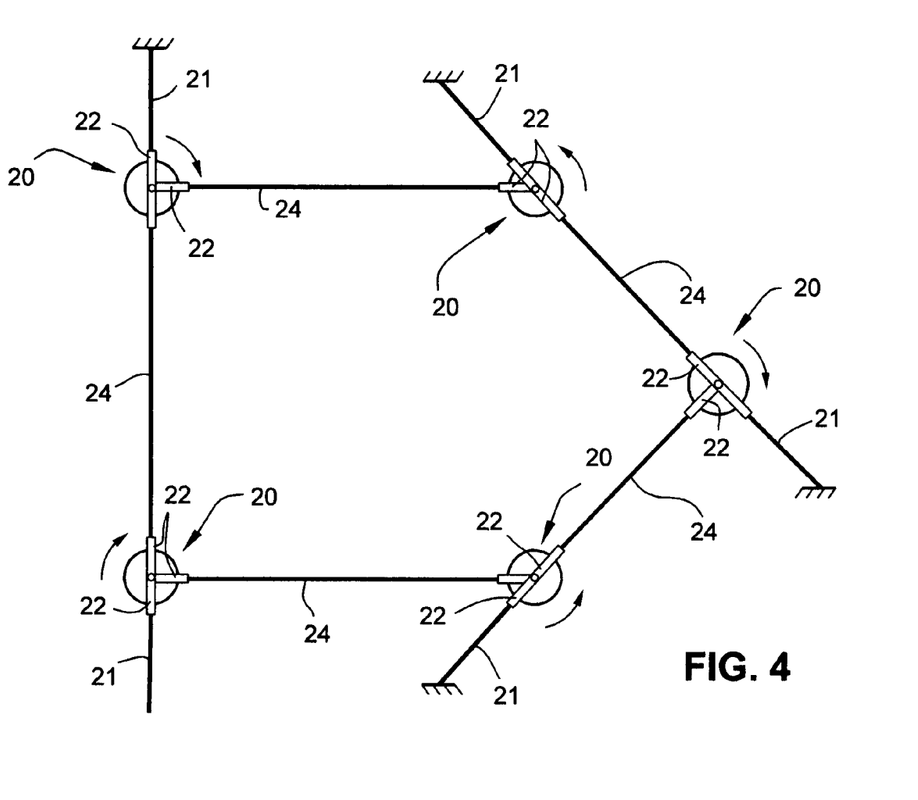
FIG. 4 is a view like that of FIG. 4 showing a different configuration of the clustered VAWTs.
Figure 5:
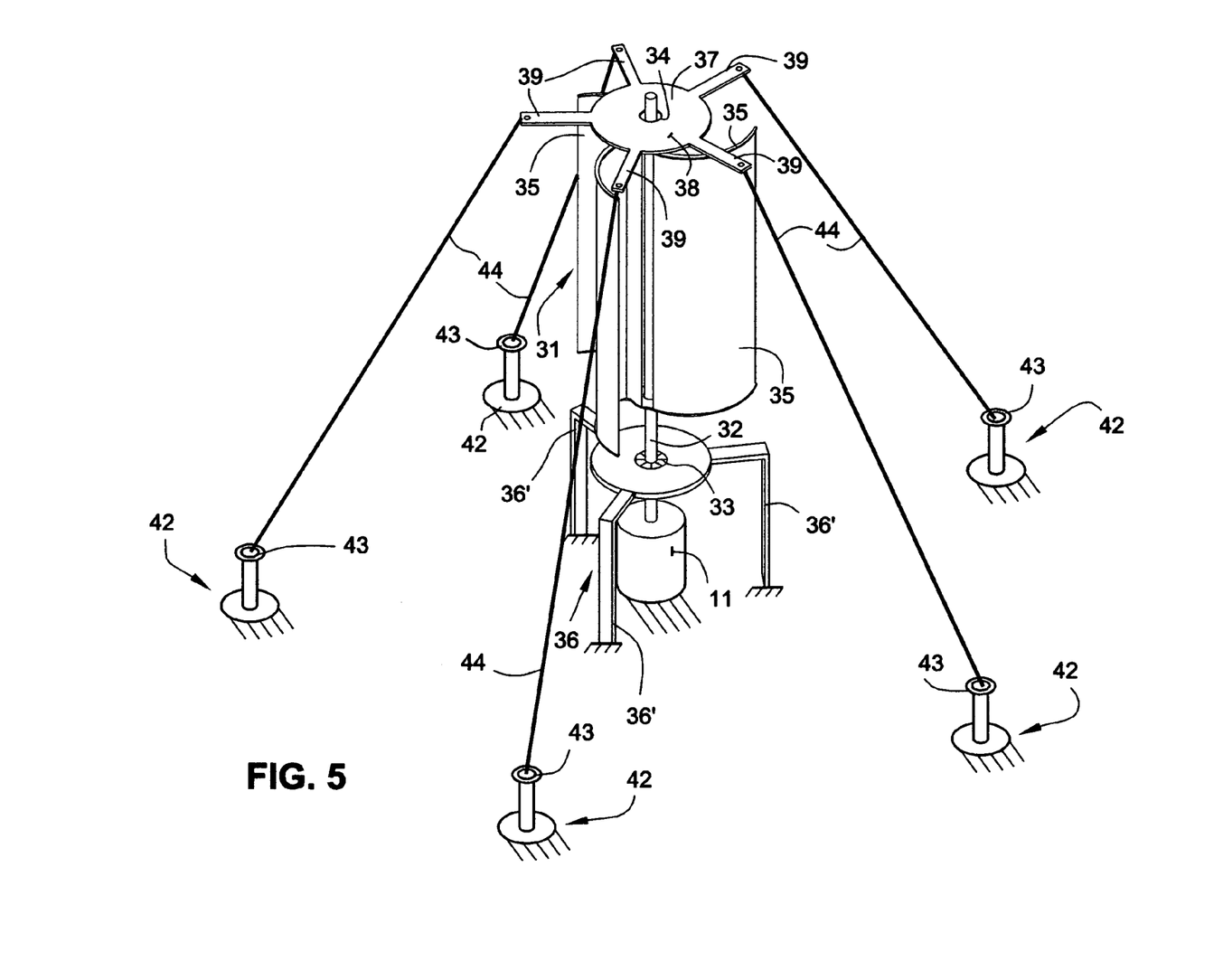
FIG. 5 is perspective schematic view of a single VAWT having particular mounting elements according to the present invention.

While only three VAWTs 10, 110, 210 are shown clustered in FIG. 1, in fact more could be clustered, almost any number, and an even number is particularly desirable where the VAWTs are arranged at the imaginary periphery of a geometric figure such as a circle, oval, or polygon. At least some of the clustered VAWTs preferably are at the apices of polygons [regular or irregular], or along the imaginary periphery of a circle or oval, with tethers most likely necessary only at the apices where a polygon configuration is used. Other VAWTs within the periphery also could be provided. FIGS. 3 & 4 are top plan schematic views of such clusters.

In FIG. 3 a substantially square configuration cluster is provided, with an optional interior VAWT. Each VAWT is shown by a reference numeral 20, each tethering cable or other strand by 21, each outrigger element by 22, and each connecting strand, rod, or bar by 24. The tethering cables 21 could be replaced by rigid support elements mounted in concrete, such as one of the rigid elements shown in the '278 application, as shown by 25 for one of the VAWTs 20 in FIG. 3.

FIG. 4 shows a pentagon cluster configuration, with the same reference numerals used as in FIG. 3. Note that some of the outrigger elements 22 in the exemplary FIG. 4 embodiment are not simple arms, but rather have complex shapes (that is, they are not simply unidirectional). In all embodiments, the outriggers 22 may be in the form of discs, plates, star-shaped elements, crosses, or other suitable shapes. Where the outriggers 22 are tethered, they extend to a point radially outward of the vanes of the VAWT 20 with which they are associated, and are constructed so as to not interfere with rotation of the vanes of the VAWT 20.

While the VAWTs 10, 110, 210 in FIG. 1 are shown with the same direction of rotation, they may be—and desirably would be in many circumstances—constructed so that at least some of them had the opposite direction of rotation. Potential directions of rotation are shown in the FIGS. 3 & 4 embodiments. Where an even number of VAWTs are provided along an imaginary periphery of a polygon, preferably alternate units have opposite directions of rotation.

Note that the arrangements in FIGS. 1-4 are much different than the clusters of wind turbines in a conventional wind farm, such as shown in U.S. Pat. Nos. 4,496,847 and 6,602, 045 and Published US Applications 2003/0227172 and 2004/ 0056486. In those arrangements the clustered elements have no common supporting elements, but rather each is self-supporting. The invention also differs significantly from ganged wind turbines, such as shown in U.S. Pat. Nos. 4,500, 259 and 4,830,570 and Published US Applications 2005/ 0263057 and 2005/0230980, where more than two wind turbines are mounted on the same rigid supporting structure (that is, they are not widely spaced from each other [as according to the invention so that there is virtually no realistic possibility of wind interference between them], and typically have a plurality of the turbines connected to the same generator or the like).

While the FIGS. 1-4 embodiments are highly desirable, in some circumstances only a single VAWT is utilized, or the VAWTs are too widely spaced to effectively utilize interconnecting support components. Under those circumstances, it is still desirable to use a supporting arrangement that is less expensive than that shown in the '278 application, yet is effective in properly mounting the VAWT. The embodiments of FIGS. 5-8 fulfill those requirements.

The VAWT 31 in FIGS. 5-8 is preferably a Savonius such as shown in co-pending applications Ser. Nos. 10/854,280, 11/265,278, 11/251,773, or 11/113,176. However, it can have other configurations, such as helical. The VAWT 31 has a central shaft structure 32 defining a substantially vertical axis of rotation, a rotor with vanes 35, and at least lower and upper bearings 33, 34, respectively. The central shaft structure 32 preferably comprises a single shaft, although multiple shafts may alternatively be provided such as disclosed in co-pending application Ser. No. 10/854,280 filed May 27, 2004.

The lower bearing 33 may be provided almost directly on the ground; however in the preferred embodiment illustrated it is mounted by a platform or relatively short tower support 36, preferably having at least three legs 36'. The support 36 preferably has sufficient height so that the bottoms of the rotating vanes 35 are above the heads of any humans, or above the height of any equipment that might be utilized. For example the top of the support 36 (which contains the bearing 33) may be between four and fourteen feet above the ground, and the bottoms of the vanes 35 between eight and fifteen (or more) feet above the ground. For example the bearing 33 could be seven feet above the ground and the bottoms of vanes 35 nine feet above the ground.

Figure 6:
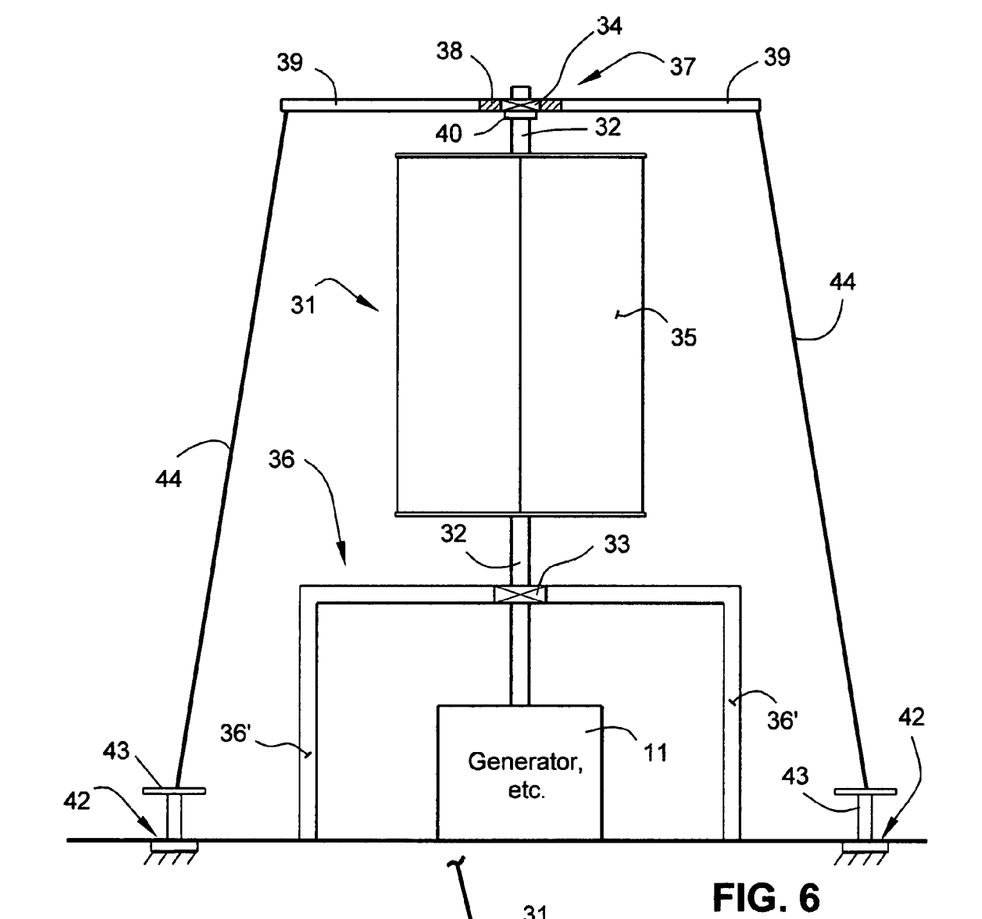
FIG. 6 is a side schematic view, mostly in elevation but partly in cross-section, of a single VAWT like that of FIG. 5 with modifications.

Preferably, a useful driven mechanism [shown by reference numeral 11 in FIG. 6 since it is the same as the structure 11 in the FIG. 1 embodiment] is operatively connected to the central shaft structure 32 below the lower bearing 33 and within the periphery of said short tower or platform 36.

Figure 7:
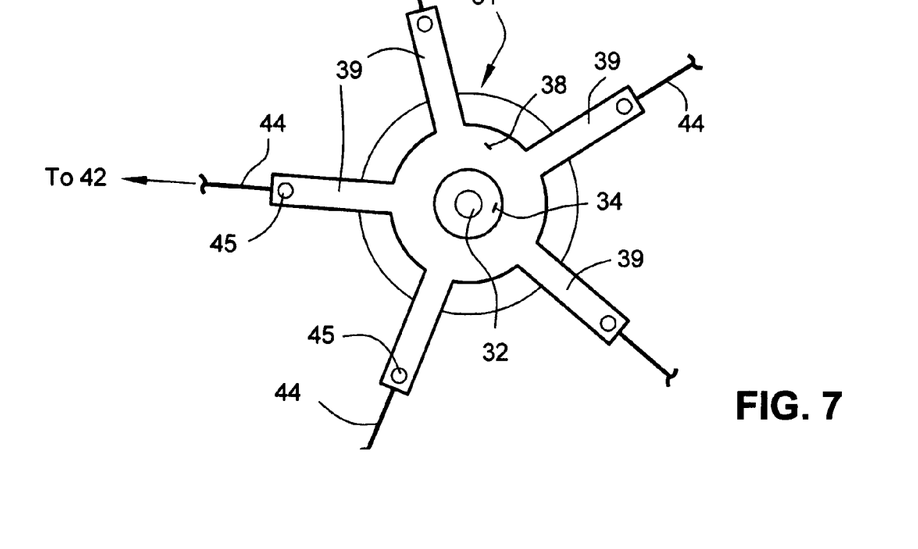
FIG. 7 is a top plan view of just the outrigger element and the top of the vanes of the turbine of FIG. 6.

The upper bearing 34 is mounted by a support element 37 similar to the outrigger elements of the FIGS. 1-4 embodiment. While the support/outrigger element 37 may have a wide variety of configurations—such as described with respect to the outriggers 22 in the FIGS. 1-4 embodiments—in the preferred embodiment illustrated the outrigger element 37 comprises a central hub section 38 and a plurality (at least three) of arms 39 extending substantially radially outwardly from hub 38. Five arms 39 are illustrated in FIG. 7, however where arms 39 are utilized anywhere between three and thirty six may be provided. While some deflection of the outrigger 37 is suitable, the outrigger 37 must be strong and rigid enough so that it does not in any way deflect enough to interfere with rotation of the vanes 35, or other rotating components of the VAWT 31.

The arms 39 each have a radius from the axis of rotation of the shaft 32 greater than the radius of the rotor vanes 35. The hub 38 securely mounts the bearing 34 and is precluded from slipping down the shaft 32 by the collar 40. The arms 39 are also operatively connected to the ground or other stationary support 42 (e. g. a concrete footing buried in the ground with a metal eyelet 43 extending outwardly from the ground, or in some cases a neighboring tree or wall)), so that the entire structure—including the platform or short tower 36—is stable.

The operative connection of the arms 39 to a conventional stationary support 42 may be provided by a plurality of conventional strands 44, such as steel cables. The strands 44 may extend through the eyelets 43 of the stationary supports 42 and the holes 45 in arms 39. Thus, the upper bearing 34 is stabilized even though there may be some minor flexing of shaft 32.

If desired, more arms 39 may be provided than strands 44 are utilized. This allows flexibility in connecting up the outrigger 37 to stationary supports depending upon the location of the VAWT 31, the surrounding terrain, the prevailing wind conditions, etc.

Figure 8:
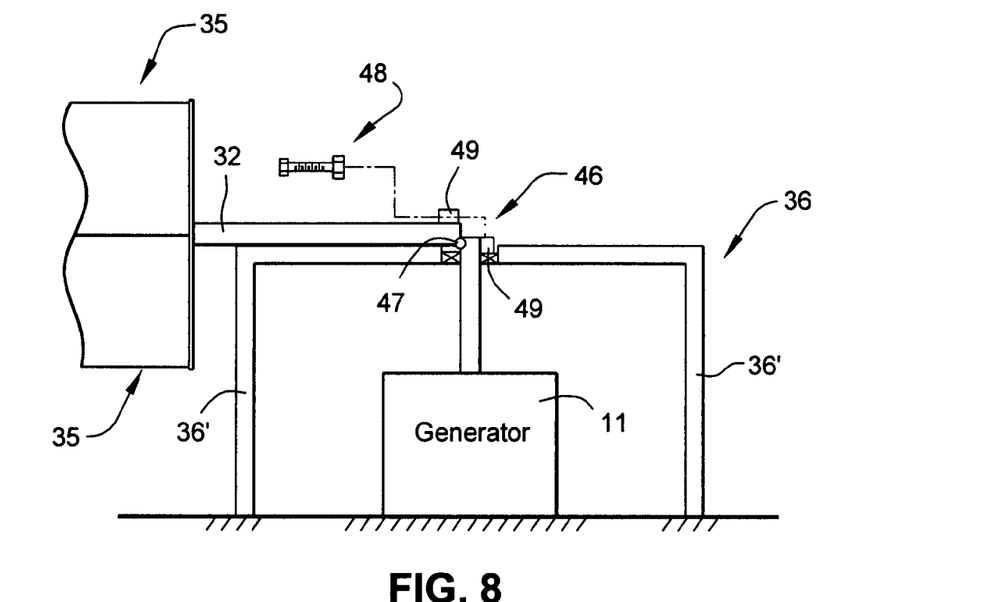
FIG. 8 is a schematic side view of a hinged shaft configuration that may optionally be used with the embodiment of FIGS. 5-7.

As seen schematically in FIG. 8, the shaft 32 may have a pivotal connection 46 at a point above the lower bearing 33. This facilitates installation of the unit, allowing the VAWT to be pivoted into place. Also, this allows the unit to be readily disassembled if disastrous weather conditions are predicted, or to repair the vanes 35 or the like. For example, if a category four or five hurricane is predicted, the strands 44 may be disconnected from the supports 42, the unit pivoted at connection 46 to the inoperative position illustrated in FIG. 8, the outrigger 37 removed or secured, the wind-catching components of the vanes 35 slit or removed, and the now substantially horizontal shaft 32 secured in place. The shaft 32 is typically pivoted so that it is supported by one of the legs 36' of the support 36. In this way the major operative components of the VAWT 31 will not be destroyed by the hurricane force winds, and the VAWT may be easily and quickly repaired and moved back into place.

The shaft pivotal connection 46 may comprise any conventional pivot (such as a partially curved piano hinge) 47 and removable fasteners (such as bolts or nuts) schematically shown at 48. The nuts and bolts 48 clamp ears 49 on opposite sides of the pivot break of the shaft together when the VAWT 31 is operative. While the shaft 32 is preferably substantially circular in cross-section, shaft 32 may be a square tube, or have flattened surfaces, or other configuration, to facilitate the ease of design and construction, and the security of operation, of the pivotal connection 46.

Figure 9:
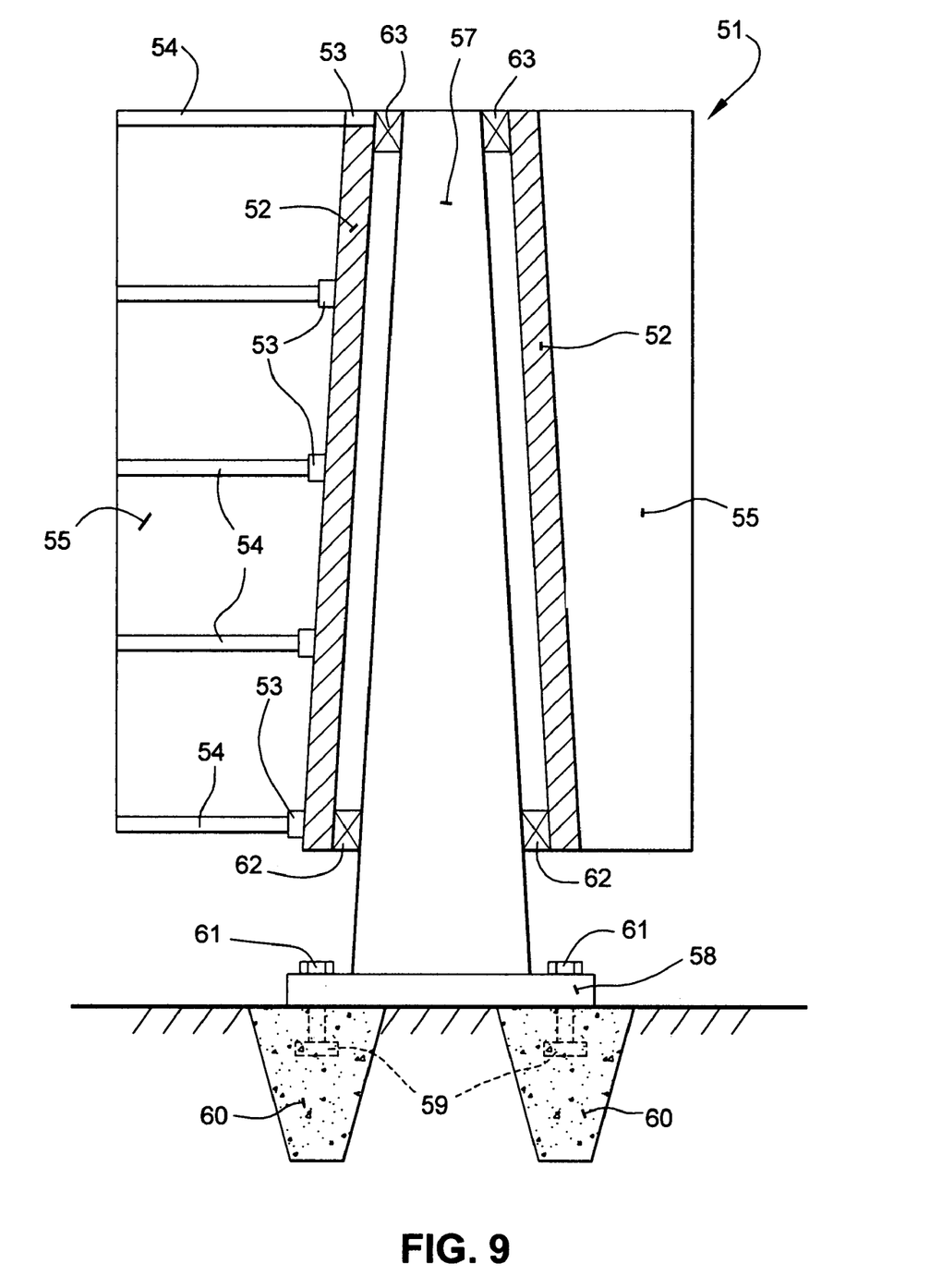
FIG. 9 is a side view, partly in cross section and partly in elevation, of an exemplary center pole mounting arrangement for a Savonius or helical VAWT.

FIG. 9 schematically illustrates a center pole mounting of a VAWT 51, particularly a Savonius of helical VAWT. Exemplary Savonius VAWTs are those such as shown in co-pending applications Ser. Nos. 11,265,278, 11/251,773, 11/113, 176, and/or 11/409,010.

The VAWT 51 comprises a hollow shaft 52 to which are connected a plurality of hubs 53 with a plurality of spoke arms or ribs 54 extending substantially radially outwardly therefrom. The arms 54 are at lest partially curved, having any desired configuration that facilitates rotation of the shaft 52 about a substantially vertical axis. Connected to the arms 54 are vanes 55, preferably of sheet material such as aluminum, steel, polycarbonate, sail cloth, or the like.

The shaft 52 is mounted for rotation by a center pole 57. The pole 57 is securely mounted in the ground, as by a bottom plate 58 having conventional bolt holes (not shown) extending therethrough and receiving three or more bolts 59 (shown in dotted line in FIG. 9), each bolt 59 preferably secured in its own concrete footing 60 (or in a common concrete pad). The plate 58 is held in place on the bolts 59 by conventional nuts 61. The center pole 57 and plate 58 are preferably of steel, aluminum, or carbon-reinforced plastic, or a similar material that can withstand the forces to be applied.

The center pole 57 may be tapered, as illustrated in FIG. 9, so that it has a greater diameter at the bottom than at the top. In this case the shaft 52 may likewise be similarly tapered with an inside diameter larger than the outside diameter of the pole 57. The pole 57 may be solid, or hollow (preferred), and may be straight (e. g. substantially perfectly cylindrical or tubular) rather than tapered in some circumstances.

Conventional bearings 62, 63 (e. g. roller or ball bearings), respectively, are provided at least adjacent the bottom and top of the shaft 52, between the shaft 52 and pole 57. One part of each bearing 62, 63 is operatively connected (in any suitable permanent or removable way) to the exterior of the pole 57, and another part operatively connected to the interior of the shaft 52. The bearings 62, 63 provide effective rotation of the VAWT 51 about a substantially vertical axis defined by pole 57.

Additional bearings (not shown) may be provided at other locations along the shaft 52, if desired. In this case access openings (not shown) are desirably provided in the shaft 52 (or the pole 57 if it is hollow and large enough in diameter for a worker to climb up a ladder therein) to allow servicing or removal of the intermediate bearings.

Figure 10:
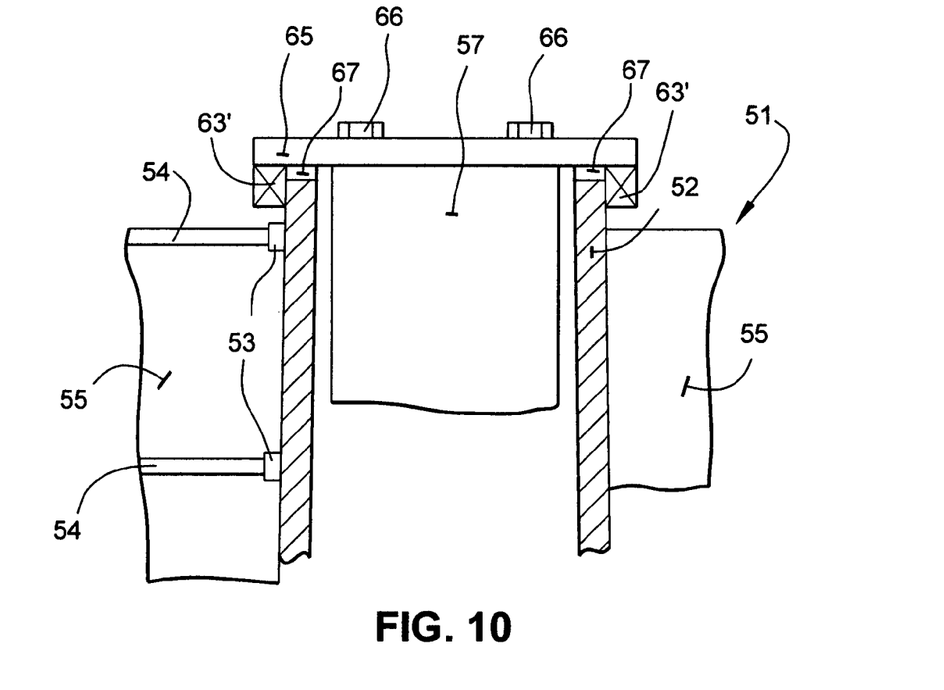
FIG. 10 is a partial view like that of FIG. 1 with a modification of the upper bearing.

FIG. 10 is a partial view like that of FIG. 9 only showing a different mounting of the top bearing 63', with like reference numerals indicating like structures in the FIGS. 9 and 10 embodiments. In the FIG. 10 embodiment, adjacent the top of the pole 57 a flange 65 is operatively connected to the pole 57 (e.g. by a plurality of bolts 66). The flange 65 also operatively mounts the upper bearing 63' so that it is exterior of the shaft 52, but performs the same function as the bearing 63 in FIG. 9. A gap 67 is provided between the top of the shaft 52 and the flange 65.

Note that the bottom bearing 62 in either the FIG. 9 or 10 embodiments may also be an exterior bearing if desired. Still further, a bearing load sharing arrangement such as illustrated in co-pending U.S. provisional application Ser. No. 60/781,342 field Mar. 13, 2006 may be provided.

The term "operatively connected", "operatively disposed", or the like means, as it normally does, any connection or disposition that allows the device or mechanism to function as designed. All narrow ranges within any disclosed broad range are also specifically included herein. Also, the invention is to be accorded the broadest interpretation possible, consistent with the prior art.

What is claimed is:

1. A cluster of a plurality of widely spaced independent vertical axis wind turbines, each connected to a separate useful driven mechanism; and a plurality of structural supports for the vertical axis wind turbines, including: an outrigger element connected at or near a top portion of each of said vertical axis wind turbines; at least one bar, strand, or rod operatively connecting each said outrigger element to an outrigger element of another vertical axis wind turbine of said cluster; and at least one tethering strand operatively connecting each outrigger element to a ground support.

2. A cluster of vertical axis wind turbines as recited in claim 1 wherein the driven structures are electricity generating or fuel gas producing elements.

3. A cluster of vertical axis wind turbines as recited in claim 1 wherein each said outrigger element is operatively connected to an upper bearing of a vertical axis wind turbine of said cluster.

4. A cluster of vertical axis wind turbines as recited in claim 1 wherein at least three vertical axis wind turbines are provided, and are arranged on the imaginary periphery of a polygon, circle, or oval.

5. A cluster of vertical axis wind turbines as recited in claim 4 wherein at least one of the wind turbines rotates in the opposite direction to at least one other wind turbine.

6. A cluster of vertical axis wind turbines as recited in claim 4 wherein an even number of wind turbines is provided, and wherein alternating turbines along the imaginary periphery rotate in opposite directions.

7. A cluster of vertical axis wind turbines as recited in claim 6 wherein the vertical axis wind turbines comprise three bladed Savonius wind turbines.

8. A cluster as recited in claim 6 further comprising an additional vertical axis wind turbine located at a central portion of said imaginary polygon, circle, or oval, said additional vertical axis wind turbine operatively connected to at least some of said wind turbines of said cluster, and devoid of a tethering strand.

9. A cluster as recited in claim 4 further comprising an additional vertical axis wind turbine located at a central portion of said imaginary polygon, circle, or oval, said additional vertical axis wind turbine operatively connected to at least some of said wind turbines of said cluster, and devoid of a tethering strand.

10. A cluster as recited in claim 9 wherein said additional vertical axis wind turbine has an outrigger element comprising four arms, each arm operatively connected to a vertical axis wind turbine of said cluster.

11. A cluster as recited in claim 1 wherein at least one of said outrigger elements has at least three arms, each arm operatively connected to another outrigger element or to a tethering strand.

12. A cluster as recited in claim 1 wherein at least one of said outrigger elements consists of four arms.

13. A cluster of at least three widely spaced, independent vertical axis wind turbines, each vertical axis wind turbine in the cluster having a structural support in common with at least one other vertical axis wind turbine of the cluster, and at least one tethering strand operatively connecting each vertical axis wind turbine to a stationary ground support; and each vertical axis wind turbine operatively connected to a separate useful driven mechanism.

14. A cluster of vertical axis wind turbines as recited in claim 13 wherein at least one of said wind turbines comprises a plurality of vanes; said vanes operatively connected to a central shaft structure mounted by at least one lower bearing for rotation about a substantially vertical axis; an outrigger operatively connected at or adjacent a top portion of said central shaft structure with an upper bearing operatively disposed between said outrigger and said central shaft structure; and a plurality of structural supports operatively connected to a plurality of different portions of said outrigger, and each also operatively connected to a stationary support.

15. A cluster of vertical axis wind turbines as recited in claim 14 wherein said at least one of said wind turbine lower bearing is mounted by a short tower or platform; and wherein said central shaft structure comprises a single shaft that has a pivotal connection above said short tower or platform.

16. A cluster of vertical axis wind turbines as recited in claim 13 wherein at least one of said wind turbines comprises a Savonius or helical vertical axis wind turbine having a hollow central shaft; a center pole extending through said shaft for mounting the Savonius or helical vertical axis wind turbine; and at least upper and lower bearings operatively disposed between said shaft and center pole for mounting said shaft for rotation with respect to said center pole about a substantially vertical axis.

17. A cluster of a plurality of widely spaced vertical axis wind turbines, each connected to a separate useful driven mechanism; and a plurality of structural supports for the vertical axis wind turbines, including: an outrigger element connected at or near a top portion of each of said vertical axis wind turbines; at least one bar, strand, or rod operatively connecting each said outrigger element to an outrigger element of another vertical axis wind turbine of said cluster; and wherein an even number of four or more vertical axis wind turbines are provided, and are arranged on the imaginary periphery of a polygon, circle, or oval with alternating turbines along the imaginary periphery rotating in opposite directions.

18. A cluster as recited in claim 17 further comprising at least one additional vertical axis wind turbine located at a central portion of said imaginary polygon, circle, or oval, and operatively connected to at least some of said vertical axis wind turbines of said cluster.

19. A cluster as recited in claim 18 wherein said four or more wind turbines arranged along said imaginary periphery comprise exactly four wind turbines; and wherein said additional vertical axis wind turbine comprises a single wind turbine located substantially at the center of said four wind turbines arranged along said imaginary periphery.

20. A cluster as recited in claim 19 wherein said center single wind turbine is operatively connected to each of said four wind turbines along said imaginary periphery.

* * * * *